United States Patent
Yu

(10) Patent No.: US 9,543,873 B2
(45) Date of Patent: Jan. 10, 2017

(54) TECHNIQUES FOR CONTROLLING ENGINE SPEED BASED ON ALTERNATOR DUTY CYCLE TO INCREASE VEHICLE EFFICIENCY

(71) Applicant: Songping Yu, Troy, MI (US)

(72) Inventor: Songping Yu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 75 days.

(21) Appl. No.: 14/702,048

(22) Filed: May 1, 2015

(65) Prior Publication Data

US 2016/0322922 A1 Nov. 3, 2016

(51) Int. Cl.
*H02P 9/00* (2006.01)
*H02P 9/04* (2006.01)

(52) U.S. Cl.
CPC ..................................... *H02P 9/04* (2013.01)

(58) Field of Classification Search
CPC ................ H02P 9/04; H02P 9/02; F03B 13/00
USPC .......... 290/40 B, 40 C, 40 R; 322/44, 59, 89
See application file for complete search history.

(56) References Cited

U.S. PATENT DOCUMENTS

| | | | |
|---|---|---|---|
| 5,614,809 A * | 3/1997 | Kiuchi ...................... | B60K 6/46 180/65.245 |
| 5,986,439 A | 11/1999 | Pletta et al. | |
| 5,998,881 A | 12/1999 | Wind et al. | |
| 6,378,492 B1 | 4/2002 | Liu | |
| 6,909,262 B2 * | 6/2005 | Yao .......................... | H02P 9/105 322/22 |
| 7,021,281 B2 | 4/2006 | Ruiz | |
| 8,569,903 B2 | 10/2013 | Gibson et al. | |
| 8,710,685 B2 | 4/2014 | Gibson et al. | |
| 8,912,672 B2 | 12/2014 | Pendray et al. | |
| 2003/0085691 A1 * | 5/2003 | Yao .......................... | H02P 9/105 322/28 |
| 2007/0268003 A1 | 11/2007 | Kolomeitsev et al. | |
| 2014/0156156 A1 * | 6/2014 | Yu ............................ | F16D 48/06 701/67 |
| 2015/0134227 A1 * | 5/2015 | Yu ............................ | F02D 28/00 701/102 |

* cited by examiner

*Primary Examiner* — Julio Gonzalez Ramirez

(74) *Attorney, Agent, or Firm* — Ralph E. Smith

(57) ABSTRACT

Techniques for controlling engine speed based on alternator duty cycle to increase overall vehicle efficiency involve increasing engine speed only after the alternator duty cycle exceeds a duty cycle threshold that is less than the maximum duty cycle of the alternator. In this manner, quantity and/or degree of engine speed increases are decreased, which increases vehicle efficiency (e.g., increased fuel economy). Moreover, by utilizing a duty cycle threshold that is less than the maximum alternator duty cycle threshold, voltage drops at an electrical system are avoided. These techniques are also applicable to both conventional alternators and smart alternators having on-board diagnostic circuitry.

16 Claims, 3 Drawing Sheets

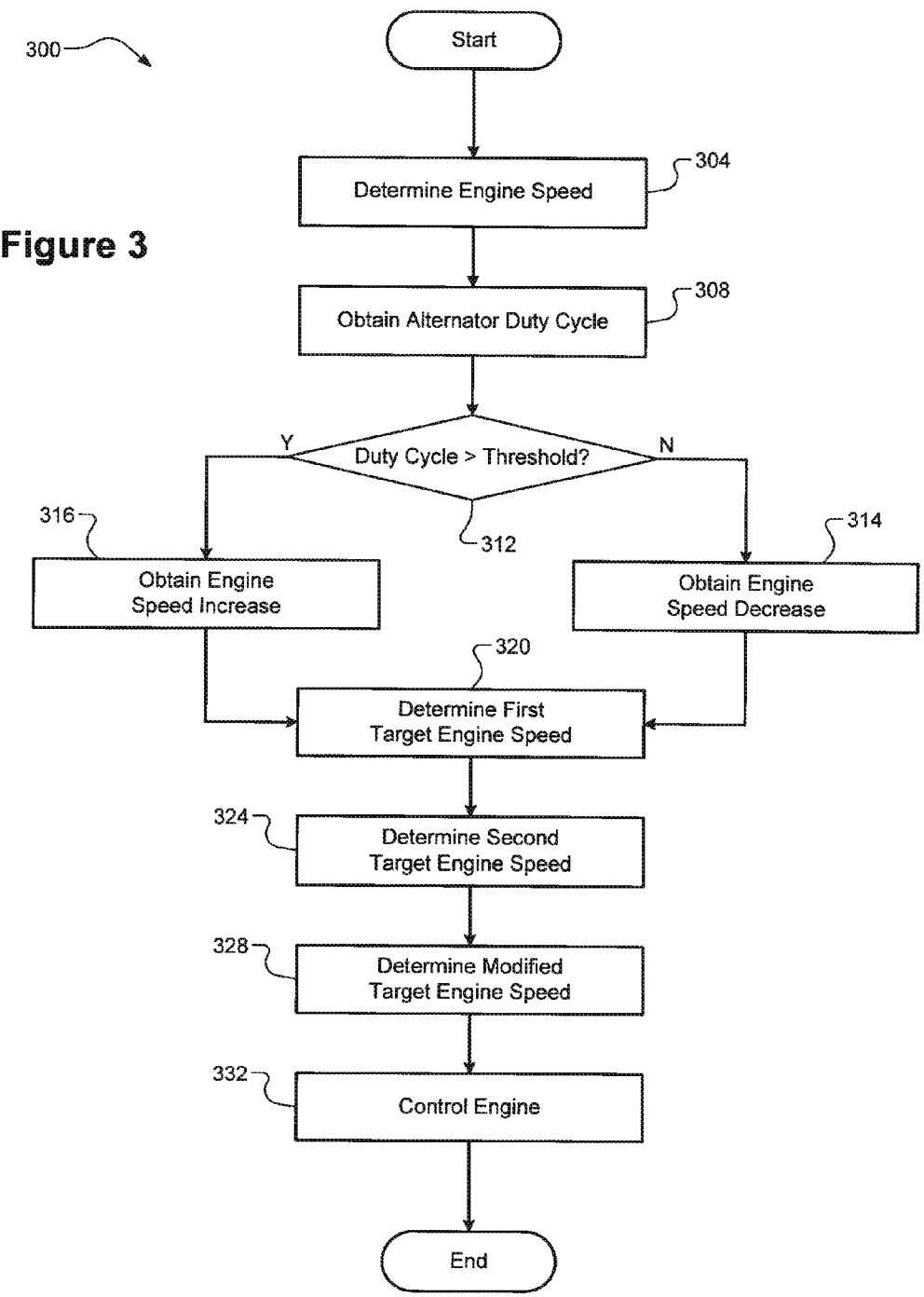

TECHNIQUES FOR CONTROLLING ENGINE SPEED BASED ON ALTERNATOR DUTY CYCLE TO INCREASE VEHICLE EFFICIENCY

FIELD

The present application relates generally to engines and, more particularly, to techniques for controlling engine speed based on alternator duty cycle to increase vehicle efficiency.

BACKGROUND

An engine combusts an air/fuel mixture within cylinders to drive pistons and generate drive torque for propelling a vehicle. An alternator of the vehicle is configured convert mechanical energy generated by the engine into electrical energy for powering components of the engine and/or the vehicle. Examples of these components include a heating, ventilating, and air conditioning (HVAC) system and a power steering system. In one implementation, the alternator includes a rotating magnetic member ("a rotor") that rotates between a set of coil conductors ("a stator"), thereby generating an alternating current.

Because the alternator is powered by the engine, the engine has to compensate for the alternator load. For example, the engine has to increase its speed in order to maintain the desired output of the alternator. Conventional engine control systems increase the engine speed to a predetermined level (e.g., via calibration) to compensate for a worst-case electrical load (e.g., all loads at maximum levels). When the electrical load on the alternator is less than this worst-case load, however, the engine is still running at the predetermined engine speed level and therefore the vehicle as a whole is operating inefficiently. Thus, while such engine control systems work for their intended purpose, there remains a need for improvement in the relevant art.

SUMMARY

In accordance with an aspect of the invention, a system for controlling a speed of an engine of a vehicle is provided. In one exemplary implementation, the system includes an alternator configured to convert mechanical energy generated by the engine into electrical energy for powering an electrical system of the vehicle; and a controller configured to: determine the engine speed; obtain a duty cycle of the alternator; when the alternator duty cycle exceeds a duty cycle threshold, obtain an engine speed increase that will cause the alternator duty cycle to decrease below the duty cycle threshold, wherein the duty cycle threshold is less than a maximum duty cycle of the alternator; determine a first target engine speed by summing the determined engine speed corresponding to alternator load and the determined engine speed increase; determine a second target engine speed that will compensate for other non-alternator loads; determine a maximum of the first and second target engine speeds to obtain a modified target engine speed; and control the engine based on the modified target engine speed.

In accordance with an aspect of the invention, a method for controlling a speed of an engine of a vehicle is provided. In one exemplary implementation, the method includes determining, by a controller of the engine, the engine speed; obtaining, by the controller, a duty cycle of an alternator of the vehicle, the alternator being configured to convert mechanical energy generated by the engine into electrical energy for powering an electrical system of the vehicle; when the alternator duty cycle exceeds a duty cycle threshold, obtaining, by the controller, an engine speed increase that will cause the alternator duty cycle to decrease below the duty cycle threshold, wherein the duty cycle threshold is less than a maximum duty cycle of the alternator; determining, by the controller, a first target engine speed by summing the determined engine speed and the determined engine speed increase corresponding to alternator load; determining, by the controller, a second target engine speed that will compensate for other non-alternator loads; determining, by the controller, a maximum of the first and second target engine speeds to obtain a modified target engine speed; and controlling, by the controller, the engine based on the modified target engine speed.

In some implementations, the controller is further configured to determine the first target engine speed based on a rate of change of the alternator duty cycle. In some implementations, when, for a period of time, (i) the alternator duty cycle is less than the duty cycle threshold and (ii) the rate of change of the alternator duty cycle is less than a rate of change threshold indicative of a stable rate of change, the controller is configured to: determine an engine speed decrease; and determine the first target engine speed by summing the determined engine speed and the engine speed decrease corresponding to the alternator load.

In some implementations, a difference between the maximum alternator duty cycle and the duty cycle threshold is appropriate for avoiding a drop in a voltage at the electrical system with a rapid electrical load increase. In some implementations, the duty cycle threshold is approximately 90% of the maximum alternator duty cycle. In some implementations, the controller is configured to control the engine based on the modified target engine speed until the alternator duty cycle decreases below the duty cycle threshold.

In some implementations, a voltage sensor is configured to measure a voltage at the alternator, and the controller is further configured to: determine the alternator duty cycle based on the measured voltage; compare the determined alternator duty cycle to the duty cycle threshold; and when the determined alternator duty cycle exceeds the duty cycle threshold, calculate the engine speed increase. In other implementations, the alternator is a smart alternator configured to: obtain the duty cycle threshold; determine its duty cycle; when its duty cycle exceeds the duty cycle threshold, calculate the engine speed increase; when its duty cycle is less than the duty cycle threshold, calculate an engine speed decrease for maintaining the alternator duty cycle at or near the duty cycle threshold; and output, to the controller, the engine speed increase or decrease.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is an example flow diagram of a method for controlling engine speed based on alternator duty cycle to increase vehicle efficiency according to the principles of the present disclosure.

DESCRIPTION

As previously discussed, there remains a need for engine control systems that control engine speed based on real-time alternator loads rather than the predetermined worst-case scenarios. Moreover, conventional engine control systems often increase engine speed in response to a voltage drop at an electrical system powered by the alternator, which may cause a noticeable disturbance for a driver. Alternator output is dependent on engine speed and alternator in-field current. The in-field current for the alternator represents a current through its coils/windings, and is different than an output current of the alternator. A duty cycle of the alternator (e.g., switching within the alternator) directly corresponds to its in-field current. In order to control the alternator output, engine speed or alternator duty cycle could be adjusted. Alternator duty cycle, however, is able to be changed faster than engine speed.

Accordingly, techniques are presented for controlling engine speed based on alternator duty cycle to increase overall vehicle efficiency. The techniques increase engine speed only after the alternator duty cycle exceeds a duty cycle threshold that is approximately the maximum duty cycle of the alternator. In this manner, quantity and/or degree of engine speed increases are decreased, which increases overall system efficiency (e.g., increased fuel economy). Moreover, by utilizing a duty cycle threshold that is less than the maximum alternator duty cycle threshold, voltage drops at the electrical system are avoided. These techniques are also applicable to both conventional alternators and smart alternators having on-board diagnostic circuitry. While the techniques are described herein with respect to engine-powered vehicles, it will be appreciated that these techniques could be applied to hybrid or electric vehicles that utilize an electric motor.

Figure 1:
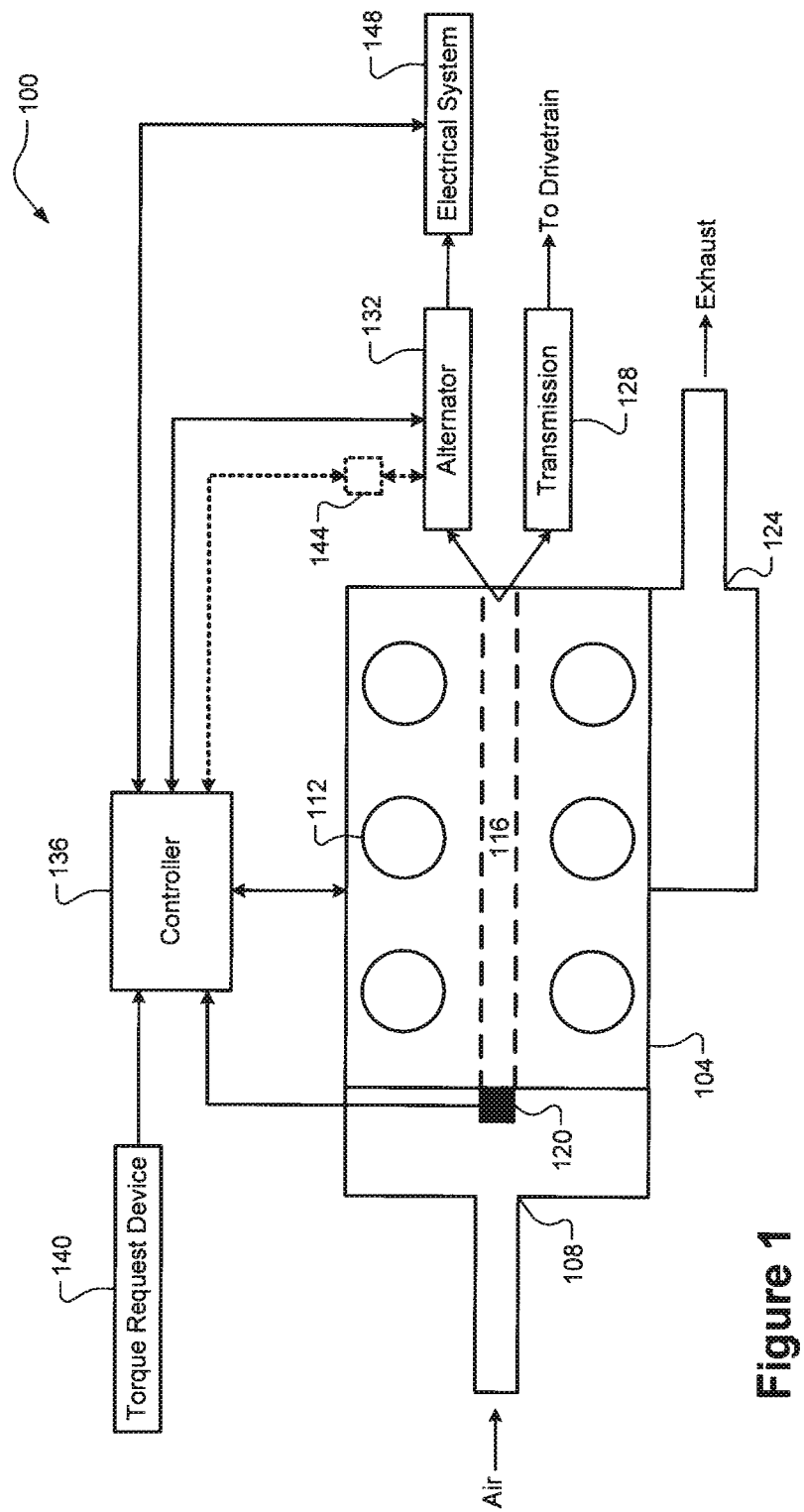
FIG. 1 is an example diagram of a vehicle according to the principles of the present disclosure.

Referring now to FIG. 1, an example diagram of a vehicle 100 is illustrated. An engine 104 draws in air through an air induction system 108 and combines the air with fuel to create an air/fuel mixture. The air/fuel mixture is compressed and combusted within a plurality of cylinders 112 to drive pistons (not shown) that generate drive torque at a crankshaft 116. An engine speed sensor 120 measures a rotational speed of the engine 104 (e.g., the crankshaft 116). Exhaust gas resulting from combustion is expelled from the cylinders 112 into an exhaust system 124. The drive torque at the crankshaft 112 is transferred to a drivetrain (not shown) of the vehicle 100 via a transmission 128. The drive torque at the crankshaft 116 also powers an alternator 132, which in turn generates an alternating current. In one exemplary implementation, the output of the alternator 132 is dependent on engine speed and an in-field current of the alternator 132. Rather, at a given engine speed, the in-field current is actively modulated to maintain a desired voltage (i.e., output power). A controller 136 or another circuit may convert the alternating current generated by the alternator 132 to a direct current.

The controller 136 controls operation of the vehicle 100. In response to a torque request from a torque request device 140, such as an accelerator or gas pedal, the controller 136 controls air, fuel, and/or spark of the engine 104 to generate a desired torque at the crankshaft 116, which corresponds to a target engine speed. In one exemplary implementation, the controller 136 controls a duty cycle of the alternator 132 based on measurements from an optional voltage sensor 144 configured to measure in the voltage of an electrical system 148 powered by the alternator 132. In another exemplary implementation, the alternator 132 is a smart alternator configured to monitor its own in-field current or voltage, control its own duty cycle, and output a change in engine speed to the controller 136. Example components of the electrical system 148 include, but are not limited to, a heating, ventilating, and air conditioning (HVAC) system, a power steering system, and a battery system.

Figure 2:
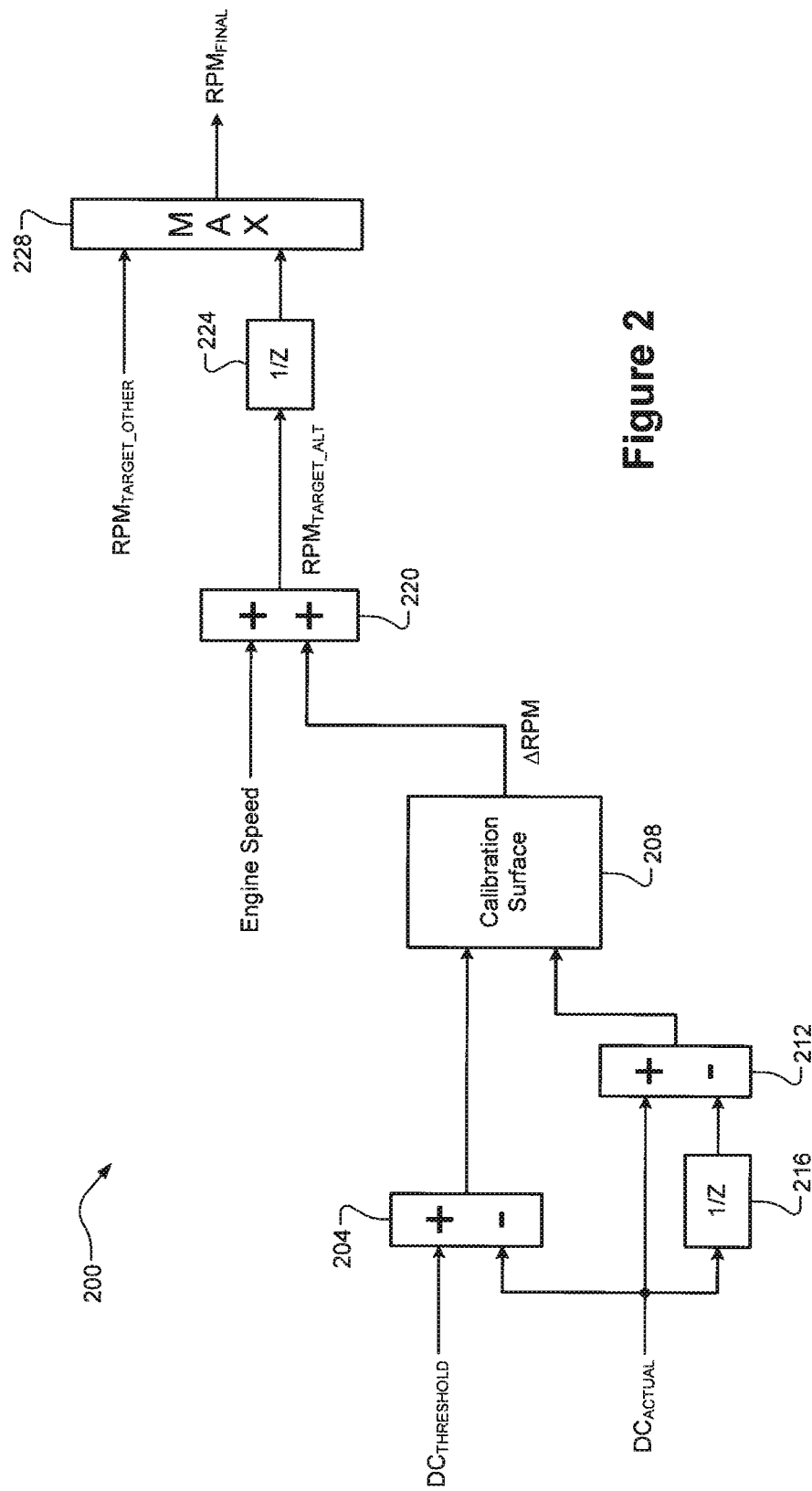
FIG. 2 is an example functional block diagram of an engine speed control architecture according to the principles of the present disclosure.

Referring now to FIG. 2, an example functional block diagram of an engine speed control architecture 200 is illustrated. A first difference block 204 calculates a difference between the actual or measured duty cycle of the alternator 132 ("$DC_{ACTUAL}$") and the threshold duty cycle ("$DC_{THRESHOLD}$"). In one exemplary implementation, the threshold duty cycle $DC_{THRESHOLD}$ is less than a maximum duty cycle of the alternator 132. For example only, the threshold duty cycle $DC_{THRESHOLD}$ could be 90% and the maximum duty cycle could be 100%. In one exemplary implementation, a difference between the maximum and threshold duty cycles (e.g., 10%) is appropriate for avoiding a drop in a voltage at the electrical system 148. In other words, once the actual duty cycle $DC_{ACTUAL}$ reaches the threshold duty cycle $DC_{THRESHOLD}$, an increase in engine speed is commanded, while still providing a buffer or margin for the actual duty cycle $DC_{ACTUAL}$ to increase more, thereby avoiding a drop in voltage at the electrical system 148 with a rapid electrical load increase. For example only, this drop in voltage could be noticeable to a driver, such as a flicker of lights or a brief decrease in an engine/cooling system fan speed.

In one exemplary implementation, the actual duty cycle $DC_{ACTUAL}$ is filtered to remove noise or other disturbances that would affect the engine speed change. The difference calculated by the first difference block is output to a calibration surface block 208. The actual duty cycle $DC_{ACTUAL}$ is also input to a second difference block 212 and a first transform block 216. An output of the first transform block 216 is also input to the second difference block 216, which calculates a difference between the output and the actual duty cycle $DC_{ACTUAL}$. An output of the second difference block 212 is also input to the calibration surface block 208. In one exemplary implementation, the first transform block 216, in conjunction with the second difference block 212, act as a lookup function to determine a rate at which the actual duty cycle $DC_{ACTUAL}$ is expected to change (e.g., based on various operating parameters).

The calibration surface block 208 calculates and outputs an engine speed change (ARPM) based on the outputs of the first and second difference blocks 204, 212. In one exemplary implementation, the magnitude of the engine speed change (ARPM) represents only a portion of an overall engine speed change or, in other words, an engine speed change that is determined during each execution loop. Because the rate of change of the actual duty cycle $DC_{ACTUAL}$ is an input, a fast change could cause a large engine speed change. Conversely, when the actual duty cycle $DC_{ACTUAL}$ is below the threshold duty cycle $DC_{THRESHOLD}$ for an extended period of time with little variation, the engine speed could be decreased accordingly to increase energy efficiency/decrease fuel consumption. This engine speed change ARPM, however, does not account for other loads (i.e., non-alternator loads). Thus, the engine speed change ARPM is input to a summation block 220 along with the engine speed.

An output of the summation block 220 represents the modified target engine speed corresponding to the alternator 132 ($RPM_{TARGET\_ALT}$). This target engine speed $RPM_{TARGET\_ALT}$ is also transformed by a second transform block 224 and the output of the second transform block 224 is input to a maximum block 228. For example only, the second transform block 224 could be a rate-limiter to rate limit changes to the target engine speed $RPM_{TARGET\_ALT}$. The target engine speed ($RPM_{TARGET}$) is also input to the maximum block 224. As previously discussed, the target engine speed is $RPM_{TARGET}$ is based on other non-alternator loads. The maximum block 228 outputs a maximum/greater of the target engine speed $RPM_{TARGET\_ALT}$ and another target engine speed corresponding to other non-alternator loads ($RPM_{TARGET\_OTHER}$). This target engine speed $RPM_{TARGET\_OTHER}$ may be greater than the target engine speed $RPM_{TARGET\_ALT}$ corresponding to the alternator 132. Thus, the output of the maximum block 208 could correspond to a final target engine speed $RPM_{FINAL}$ that is greater than was necessary for the alternator 132.

In other words, there could be multiple engine speed change requestors. Typically, a requestor with the highest engine speed change is an arbitration winner. Thus, as discussed above, the actual engine speed may not always follow a requested value corresponding to the alternator 132. In this manner, the maximum block 228 intends to make sure that, when the alternator 132 needs the engine speed change ARPM to meet the electrical load demand, this request for the engine speed ARPM will be granted or performed immediately. When the actual engine speed is greater than the requested value corresponding to the alternator 132, however, the electrical load requirement is still completely satisfied, although vehicle efficiency/fuel consumption may be less than optimal from the viewpoint of alternator operation.

Referring now to FIG. 3, an example flow diagram of a method 300 for controlling engine speed based on alternator duty cycle to increase vehicle efficiency is illustrated. At 304, the controller 136 determines the engine speed (e.g., from the engine speed sensor 120). At 308, the controller 136 obtains the alternator duty cycle. At 312, the controller 136 determines whether the alternator duty cycle exceeds a duty cycle threshold. If true, the method 300 proceeds to 316 where the controller 136 obtains an engine speed increase that will cause the alternator duty cycle to decrease below the duty cycle threshold that is less than the maximum alternator duty cycle and the method 300 then proceeds to 320. If the alternator duty cycle does not exceed the duty cycle threshold, however, the method 300 proceeds to 314 where the controller 136 determines a potential engine speed decrease for maintaining the alternator duty cycle as close to the duty cycle threshold as possible. The method 300 then proceeds to 320.

At 320, the controller 136 determines a first target engine speed by summing the determined engine speed and the determined engine speed increase or decrease. At 324, the controller 136 determines a second target engine speed that will compensate for other non-alternator loads. At 328, the controller 136 determines a maximum of the first and second target engine speeds to obtain a modified target engine speed. At 332, the controller 136 controls the engine 104 based on the modified target engine speed. The method 300 ends or returns to 304 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for controlling a speed of an engine of a vehicle, the system comprising:
    an alternator configured to convert mechanical energy generated by the engine into electrical energy for powering an electrical system of the vehicle; and
    a controller configured to:
        determine the engine speed;
        obtain a duty cycle of the alternator;
        when the alternator duty cycle exceeds a duty cycle threshold, obtain an engine speed increase that will cause the alternator duty cycle to decrease below the duty cycle threshold, wherein the duty cycle threshold is less than a maximum duty cycle of the alternator;
        determine a first target engine speed by summing the determined engine speed and the engine speed increase corresponding to alternator load;
        determine a second target engine speed that will compensate for other non-alternator loads;
        determine a maximum of the first and second target engine speeds to obtain a modified target engine speed; and
        control the engine based on the modified target engine speed.

2. The system of claim 1, wherein the controller is further configured to determine the first target engine speed based on a rate of change of the alternator duty cycle.

3. The system of claim 1, wherein when, for a period of time, (i) the alternator duty cycle is less than the duty cycle threshold and (ii) the rate of change of the alternator duty cycle is less than a rate of change threshold indicative of a stable rate of change, the controller is configured to:
    determine an engine speed decrease; and
    determine the first target engine speed by summing the determined engine speed and the engine speed decrease.

4. The system of claim 1, wherein a difference between the maximum alternator duty cycle and the duty cycle threshold is appropriate for avoiding a drop in a voltage at the electrical system with a rapid electrical load increase.

5. The system of claim 4, wherein the duty cycle threshold is approximately 90% of the maximum alternator duty cycle.

6. The system of claim 1, further comprising a voltage sensor configured to measure a voltage at the alternator, wherein the controller is further configured to:
    determine the alternator duty cycle based on the measured voltage;
    compare the determined alternator duty cycle to the duty cycle threshold; and
    when the determined alternator duty cycle exceeds the duty cycle threshold, calculate the engine speed increase.

7. The system of claim 1, wherein the alternator is a smart alternator configured to:
    obtain the duty cycle threshold;
    determine the duty cycle;
    when the duty cycle exceeds the duty cycle threshold, calculate the engine speed increase;

when the duty cycle is less than the duty cycle threshold, calculate an engine speed decrease for maintaining the alternator duty cycle at or near the duty cycle threshold; and output, to the controller, the engine speed increase or decrease.

8. The system of claim 1, wherein the controller is configured to control the engine based on the modified target engine speed until the alternator duty cycle decreases below the duty cycle threshold.

9. A method for controlling a speed of an engine of a vehicle, the method comprising:
   determining, by a controller of the engine, the engine speed;
   obtaining, by the controller, a duty cycle of an alternator of the vehicle, the alternator being configured to convert mechanical energy generated by the engine into electrical energy for powering an electrical system of the vehicle;
   when the alternator duty cycle exceeds a duty cycle threshold, obtaining, by the controller, an engine speed increase that will cause the alternator duty cycle to decrease below the duty cycle threshold, wherein the duty cycle threshold is less than a maximum duty cycle of the alternator;
   determining, by the controller, a first target engine speed by summing the determined engine speed and the engine speed increase corresponding to alternator load;
   determining, by the controller, a second target engine speed that will compensate for other non-alternator loads;
   determining, by the controller, a maximum of the first and second target engine speeds to obtain a modified target engine speed; and
   controlling, by the controller, the engine based on the modified target engine speed.

10. The method of claim 9, wherein determining the first target engine speed is based further on a rate of change of the alternator duty cycle.

11. The method claim 9, further comprising when, for a period of time, (i) the alternator duty cycle is less than the duty cycle threshold and (ii) the rate of change of the alternator duty cycle is less than a rate of change threshold indicative of a stable rate of change:
   determining, by the controller, an engine speed decrease; and
   determining, by the controller, the first target engine speed by summing the determined engine speed and the engine speed decrease.

12. The method of claim 9, wherein a difference between the maximum alternator duty cycle and the duty cycle threshold is appropriate for avoiding a drop in a voltage at the electrical system with a rapid electrical load increase.

13. The method of claim 12, wherein the duty cycle threshold is approximately 90% of the maximum alternator duty cycle.

14. The method of claim 9, further comprising:
   receiving, by the controller from a voltage sensor, a measured voltage at the alternator;
   determining, by the controller, the alternator duty cycle based on the measured voltage;
   comparing, by the controller, the determined alternator duty cycle to the duty cycle threshold; and
   when the determined alternator duty cycle exceeds the duty cycle threshold, calculate, by the controller, the engine speed increase.

15. The method of claim 9, wherein the alternator is a smart alternator configured to:
   obtain the duty cycle threshold;
   determine the duty cycle;
   when the duty cycle exceeds the duty cycle threshold, calculate the engine speed increase;
   when the duty cycle is less than the duty cycle threshold, calculate an engine speed decrease for maintaining the alternator duty cycle at or near the duty cycle threshold; and
   output, to the controller, the engine speed increase or decrease.

16. The method of claim 9, wherein controlling the engine based on the modified target engine speed is performed until the alternator duty cycle decreases below the duty cycle threshold.

* * * * *